United States Patent [19]
Morisawa

[11] Patent Number: 5,903,790
[45] Date of Patent: May 11, 1999

[54] VIEW FINDER FOR AN ELECTRIC STILL CAMERA

[75] Inventor: Tahei Morisawa, Tokyo, Japan

[73] Assignee: Asahi Kogaku Kogyo Kabushiki Kaisha, Tokyo, Japan

[21] Appl. No.: 08/562,890

[22] Filed: Nov. 27, 1995

[30] Foreign Application Priority Data

Nov. 25, 1994 [JP] Japan .................................. 6-315490

[51] Int. Cl.⁶ .................................................. G03B 19/00
[52] U.S. Cl. ........................................................... 396/429
[58] Field of Search .................................. 399/206, 211; 396/429; 348/220, 231, 294, 297, 333, 341

[56] References Cited

U.S. PATENT DOCUMENTS

| | | | |
|---|---|---|---|
| 4,714,962 | 12/1987 | Levine | 358/209 |
| 4,755,880 | 7/1988 | Haenel et al. | 358/213.11 |
| 4,893,196 | 1/1990 | Koshiyouji et al. | 358/474 |
| 5,161,233 | 11/1992 | Matsuo et al. | 355/218 |
| 5,179,478 | 1/1993 | Aoki | 360/35.1 |
| 5,294,990 | 3/1994 | Aoki | 348/363 |
| 5,298,931 | 3/1994 | Suzuki et al. | 354/225 |
| 5,392,100 | 2/1995 | Yoshida | 355/235 |
| 5,424,156 | 6/1995 | Aoki et al. | 430/59 |
| 5,467,204 | 11/1995 | Hatano et al. | 358/482 |
| 5,528,297 | 6/1996 | Seegert et al. | 348/333 |

FOREIGN PATENT DOCUMENTS

| | | |
|---|---|---|
| 0327236 | 8/1989 | European Pat. Off. . |
| 2-29081 | 1/1990 | Japan . |
| 3-296014 | 12/1991 | Japan . |
| 5-2280 | 1/1993 | Japan . |
| 5-150251 | 6/1993 | Japan . |
| 6-313894 | 11/1994 | Japan . |

*Primary Examiner*—Safet Metjahic
*Assistant Examiner*—John Chizmar
*Attorney, Agent, or Firm*—Greenblum & Bernstein, P.L.C.

[57] ABSTRACT

A view finder for an electronic still camera includes a photographing optical system which is provided in front of a recording medium to form a picture image on the recording medium, and a viewing optical system which is provided optically behind the recording medium and on the optical axis of the photographing optical system. The picture image formed on the recording medium is viewed through the viewing optical system.

21 Claims, 4 Drawing Sheets

VIEW FINDER FOR AN ELECTRIC STILL CAMERA

BACKGROUND OF THE INVENTION

1. Field of the Invention

The present invention relates to a view finder for an electronic still camera, which uses a recording medium on which an optical image, formed by a photographing lens, is recorded as a visible image.

2. Description of Related Art

It is known to use a silver halide photographic material as an optical image recording material, since it exhibits a high photosensitivity and resolution, and can be obtained at a low cost. However, a troublesome developing process is required and a visible image cannot be obtained at the time of photographing.

To simplify the developing process, a dry process has been proposed. However, even in the proposed dry process, an instant development is not possible. That is, an image cannot be viewed during the photographing operation. Numerous other non-halide photographic materials are known including electronic photographic materials, diazo photographic materials, free radical photographic materials etc. However, none of these have the same optical properties as those belonging to the silver halide photographic material. Moreover, instant development is not possible using these photographic materials. Note that since electronic photographic materials can be developed using the dry process and that an electrostatic latent image obtained by the exposure can be immediately developed using toner etc., electronic photographic materials have been widely used mainly in copying machines.

In electronic photographing technology, a photographic material from which a recording medium is made has been proposed, wherein the recording medium itself can be directly electronically developed, and a developed visible image thereof can be immediately obtained without any chemical treatment being necessary after exposure. Note that in this specification the recording medium which can be electronically developed is referred to as an electronic development type recording medium.

In Japanese Unexamined Patent Publication No. 5-2280, for example, a recording medium is disclosed, which is comprised of an electrostatic data recording medium and an electric charge holding medium in combination. The electrostatic data recording medium is provided with a photoconductive layer and an inorganic oxide layer, and the charge holding medium is provided with a liquid crystal display element. In this arrangement, if the electrostatic data recording medium is exposed while a voltage is applied between the electrostatic data recording medium and the charge holding medium, electric charges, corresponding to the quantity of light to be incident thereupon, are produced. The intensity of an electric field to be applied to the liquid crystal display element, opposed to the electrostatic data recording medium, varies depending on the electric charges produced. An image corresponding to the distribution of the quantity of light is displayed in the liquid crystal display element, i.e. it has been developed.

Japanese Unexamined Patent Publication No. 5-150251 discloses a dispersive liquid crystal display element in which the image displayed on the liquid crystal display element can be maintained even after the electric field to be applied thereto has been removed.

When an electronic development type recording medium is used with an electronic still camera, it is conventional to make use of either a single lens reflex type view finder, or an optical view finder independent from a photographing optical system. However, in these types of view finders many optical elements are necessary and thus the structure of the camera is complicated.

SUMMARY OF THE INVENTION

It is an object of the present invention to provide a simple view finder which can be comprised of fewer optical elements.

To achieve the object mentioned above, according to the present invention, there is provided a view finder for an electronic still camera, comprising a photographing optical system which is provided in front of a recording medium to form a picture image on the recording medium. The recording medium being a light transmission type medium on which a visible picture image is directly formed. A viewing optical system is provided optically behind the recording medium and on the optical axis of the photographing optical system, so that the picture image formed on the recording medium can be viewed through the viewing optical system.

The view finder further comprises a light source provided between the photographing optical system and the recording medium to illuminate the recording medium. A scanning optical system is also provided in the optical path of that light transmitted through the recording medium by the light source, to read the optical image formed on the recording medium. The scanning optical system and the light source are both movable with respect to the recording medium.

The present disclosure relates to subject matter contained in Japanese Patent Application No. 06-315490 (filed on Nov. 25, 1994) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
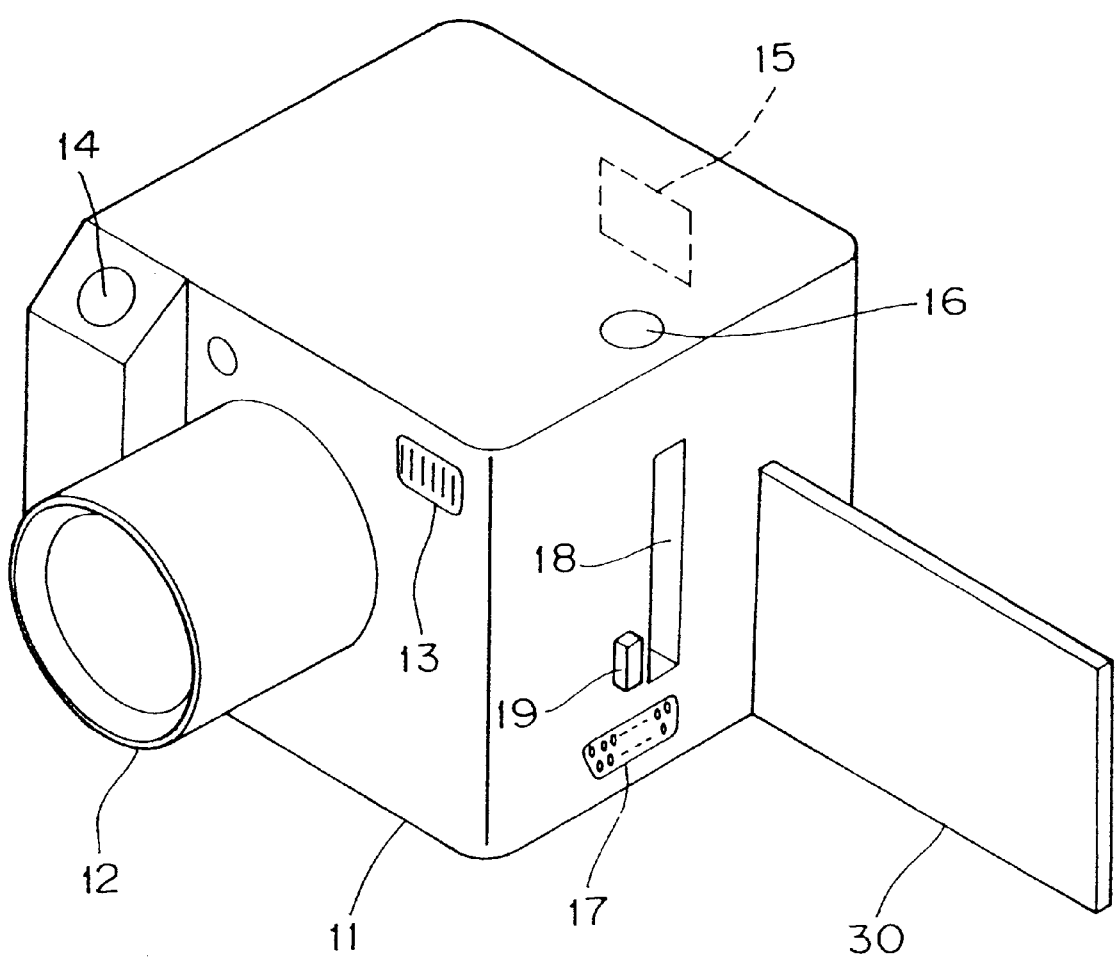
FIG. 1 is a perspective view of a still video camera to which the present invention is applied.

FIG. 1 shows an embodiment of a single lens reflex type of still video camera according to the present invention.

As viewed from the front of a camera body 11, there is a photographing optical system 12 having a photographing lens located, substantially, in the central part of the camera body. A strobe 13 is provided above and to the right of the photographing optical system 12. A release switch 14 is provided on the opposite side of the strobe 13. A scanning start switch 16 is provided on the upper surface of the camera body 11. A finder 15 is provided on the rear surface of the camera body 11, behind the photographing optical system 12. The camera body 11 is provided, on the lower portion of a side surface thereof, with an output terminal 17 from which an image signal, produced in the camera body 11, is output to an external recording device, for example. Also, the camera body 11 is provided on the same side surface as the output terminal 17 with a slot 18 into which an electronic development type recording medium 30 can be fitted. An ejection switch 19 is provided in the vicinity of the slot 18, which is depressed to eject the electronic development type recording medium 30 inserted in the slot 18 therefrom.

Figure 2:
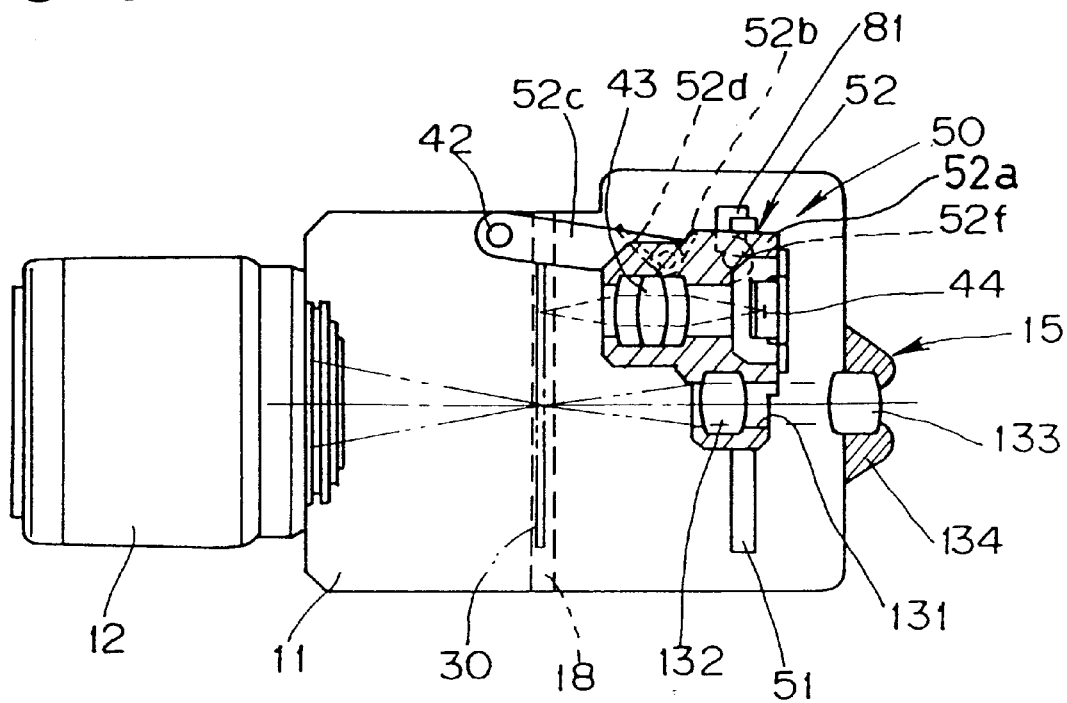
FIG. 2 is a plan view of a still video camera showing an internal structure thereof, upon recording an optical image on an electronic development type recording medium, according to the present invention.
Figure 3:
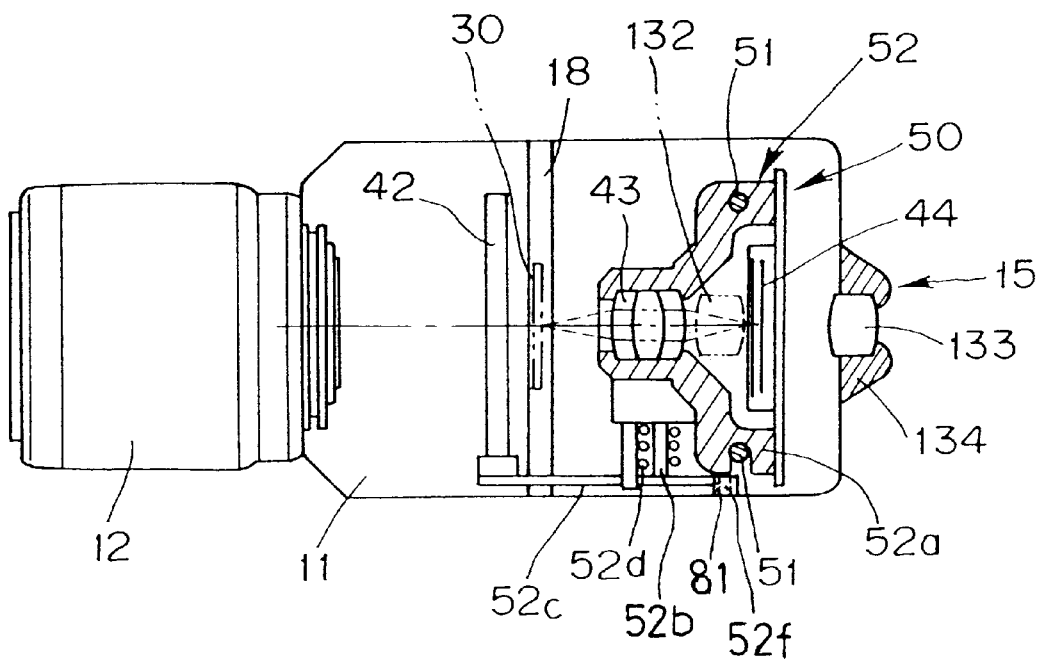
FIG. 3 is a side view of the still video camera shown in FIG. 2.
Figure 4:
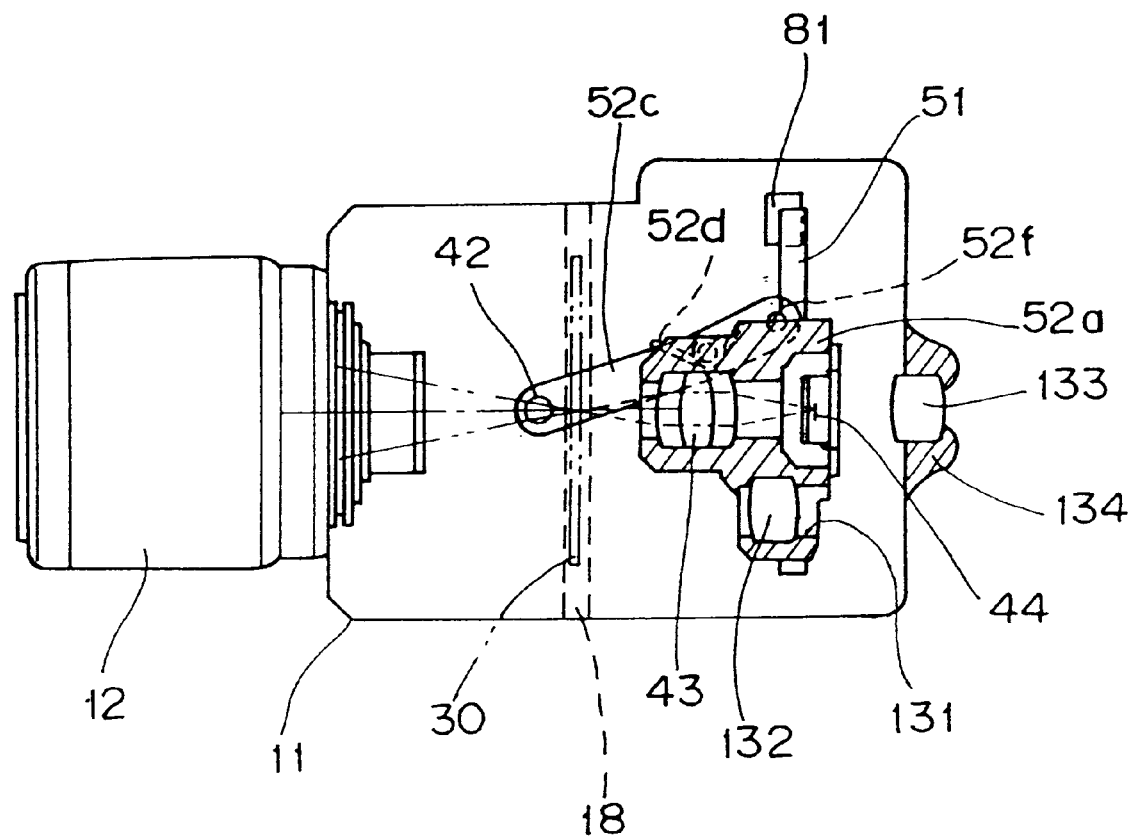
FIG. 4 is a plan view of a still video camera showing an internal structure thereof, upon reading images recorded on an electronic development type recording medium therefrom; and, FIG. 5 is a schematic view of an electronic development type recording medium.

FIGS. 2 through 4 show an internal structure of the camera body 11.

The electronic development type recording medium 30 is located in the camera body 11 in a position where images are formed, behind the photographing optical system 12. The images formed on the electronic development type recording medium 30 are developed as visible images and can be read upon driving a sub-scanning mechanism 50.

The sub-scanning mechanism 50 is provided with a light source 42 which emits illuminating light onto the electronic development type recording medium 30. The light source 42 is mounted, through a light source supporting arm 52c, onto a movable block 52 which can be moved along guide shafts 51. The movable block 52 is provided with a scanning optical system 43 and a line sensor 44. Both the scanning optical system 43 and the line sensor 44 are located on the opposite side of the light source 42 with respect to the electronic development type recording medium 30. The scanning optical system 43 lies in the optical path of the light emitted from the light source 42 and transmitted through the electronic development type recording medium 30. The line sensor 44 is located at a position where the images are formed by the scanning optical system 43.

The light source 42 is, for example, comprised of a plurality of LED's aligned in a row and a collimating lens which collimates the light emitted from the LED's, so that the recording medium 30 is illuminated by the collimated light flux. The line sensor 44 extends in a direction parallel with the aligned row of LED's, as shown in FIG. 4.

The light source supporting arm 52c is rotatably mounted to a shaft 52b provided on the body 52a of the movable block 52, as shown in FIG. 3. Along the shaft 52b, positioned between the light source supporting arm 52c and the body 52a, is a spring 52d. The light source supporting arm 52c is provided, on the end opposite the light source 42, with a pin 52f which can be engaged by a stop 81. The stop 81 is provided in substantially the same plane as the guide shafts 51. The spring 52d continuously biases the light source supporting arm 52c to rotate about the shaft 52b in the counterclockwise direction, as viewed from FIG. 2. Consequently, when the movable block 52 is located in the position at one end of the shafts where the pin 52f is pressed against the stop 81, a rotation of the light source supporting arm 52c in the clockwise direction results. This state is clearly shown in FIG. 2.

When the pin 52f is disengaged from the stop pin 81 the light supporting arm 52c is rotated in the counterclockwise direction by the spring 52d until it is engaged by another stop (not shown) provided on the movable block 52. This engagement occurs when the light source 42 is located on the optical axis of the scanning optical system 43. This state is clearly shown in FIG. 4.

The body 52a of the movable block 52 is provided on one side of the scanning optical system with an opening 131 in which a relay lens 132 is provided, as shown in FIG. 2. Namely, the optical axis of the relay lens 132 is located in a position parallel to the optical axis of the scanning optical system 43. The relay lens 132 is movable together with the scanning optical system 43 and the line sensor 44. A finder 15 is provided with a magnifier 133, secured through a securing member 134 to the camera body 11, behind the photographing optical system 12. The optical axis of the magnifier 133 is coincident with the optical axis of the photographing optical system 12.

When the body 52a is located at one end of the guide shafts 51, as shown in FIG. 2, the relay lens 132 is axially aligned with both the photographing optical system 12 and the magnifier 133, so that an object image formed on the electronic development type recording medium 30, by the photographing optical system 12, can be viewed through the magnifier 133. Thus, the relay lens 132 and the magnifier 133 constitute a viewing optical system. Also, since the pin 52f abuts against the stop 81, the light source supporting arm 52c is rotated in a clockwise direction against the force of the spring 52d. In this state, the light source 42 is withdrawn from the optical axis of the scanning optical system 43 and does not oppose the electronic development type recording medium 30, as shown in FIG. 2.

Figure 5:
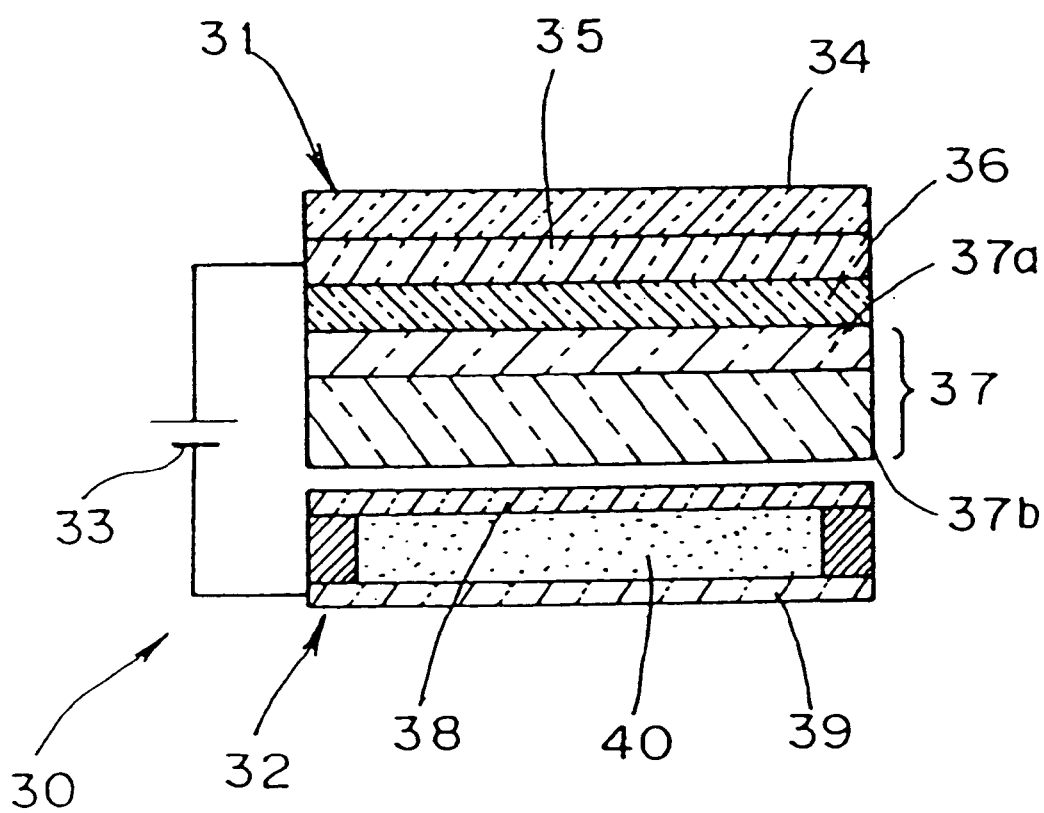

FIG. 5 shows the internal structure of the electronic development type recording medium 30 which is disclosed in Japanese Unexamined Patent Publication No. 5-2280.

The electronic development type recording medium 30 comprised an electrostatic data recording medium 31 and an electric charge holding medium 32. The electrostatic data recording medium 31 has a laminated structure consisting of a substrate 34, an electrode layer 35, an inorganic oxide layer 36, and a photoconductive layer 37. The photoconductive layer 37 is made up of an electric charge generating layer 37a and an electric charge carrying layer 37b laid thereon. The charge holding medium 32 comprises of a liquid crystal support 38, a liquid crystal electrode layer 39, and a liquid crystal 40 enclosed between the liquid crystal support 38 and the liquid crystal electrode layer 39. The charge carrying layer 37b of the electrostatic data recording medium 31 is opposed to the liquid crystal support 38 of the charge holding medium 32 with a slight gap therebetween.

A power source 33 is provided in the camera body 11. When the electronic development type recording medium 30 is set in a correct position through the slot 18, the electronic development type recording medium 30 is connected to the power source 33 as shown in FIG. 5. The power source 33 is turned ON or OFF by a recording medium driving circuit (not shown). When the power source 33 is ON, a voltage is applied between the electrode layer 35 and the liquid crystal electrode layer 39, i.e. between the electrostatic data recording medium 31 and the charge holding medium 32. In this state, if the electrostatic data recording medium 31 is exposed, the electric charges corresponding to the images are generated in the electrostatic data recording medium 31. Consequently, the intensity of the electric field acting on the liquid crystal 40 varies depending on the electric charges, and hence, a visible image is indicated in the liquid crystal, and the object image is developed. The charge holding medium 32 is made of a dispersive liquid crystal display element, and accordingly, the developed visible image is maintained even after the electric field has been removed. The developed visible image can be erased by heating the dispersive liquid crystal display element to a predetermined temperature by a heater (not shown), thus the same recording medium can be used repeatedly.

The viewing optical system of the present invention will now be explained in detail.

When a picture has yet to be taken, i.e. the object to be photographed is being viewed, the body 52a of the movable block 52 is located in the position where the pin 52f abuts against the stop 81. Consequently, the clockwise rotation of the light source supporting arm 52c takes place, and hence the light source 42 is moved to a position in which it is withdrawn from the optical axis (the optical axis being defined as having a width approximately equal to the distance between the relay lens 132 and the scanning optical system 43), i.e. it is not opposed to the electronic development type recording medium 30 and the scanning optical system 43, as is clearly illustrated in FIG. 2. In this state, the object image is formed, by the photographing optical system 12, on the electrostatic data recording medium 31 (FIG. 5) of the electronic development type recording medium 30. The object image can be viewed through the magnifier 133 after passing through the relay lens 132. Namely, when the object to be photographed is observed, the electronic development type recording medium 30 serves as a focusing plate for the photographing optical system 12, so that the object image formed on the focusing plate can be viewed through the viewing optical system (the relay lens 132 and the magnifier 133). In this state, if the release switch 14 is depressed, the voltage is applied to the electronic development type recording medium 30, so that the object image is developed in the liquid crystal 40 (FIG. 5) of the electronic development type recording medium.

To enable the line sensor 44 to read the image developed in the electronic development type recording medium 30 the scanning start switch 16 is depressed. Consequently, the movable block 52 is moved in a direction parallel to the electronic development type recording medium 30, as shown in FIG. 4. As the movable block 52 is moved from one end of the guide shafts 51 (FIG. 2), the pin 52f is disengaged from the stop 81. Consequently, the light source supporting arm 52c is rotated in a counterclockwise direction about the shaft 52b by the spring 52d, so that the light source 42 is moved into the optical axis of the scanning optical system 43. Thus, sub-scanning, to read the recorded images, is carried out by the movement of the light source 42, the scanning optical system 43, and the line sensor 44 along the electronic development type recording medium 30. During sub-scanning, since the relay lens 132 is displaced from the optical axis of the photographing optical system 12 and the magnifier 133, the view finder system is inoperative. However, this does not matter when the recorded images are being read.

As will be appreciated by those skilled in the art, the sub-scanning mechanism 50 may include various drive mechanisms for driving the movable block 52 to perform the sub-scanning operation. Such drive mechanisms may include a motion transmission mechanism driven by a motor. In addition, any of various control mechanisms may be incorporated to control the sub-scanning mechanism 50 in response to the operation of the switch 16. For instance, the control circuit disclosed in co-pending U.S. patent application (Attorney Docket No. P14023), entitled "Optical Image Recording and Reading Apparatus" in the names of T. MORISAWA et al. filed on Oct. 31, 1995, may be utilized. The disclosure of the above-noted co-pending application is expressly incorporated herein by reference in its entirety.

As can be understood from the above discussion, according to the present invention, since the viewing optical system is comprised of the relay lens 132 provided on the main body 52a of the movable block 52, and the magnifier 133 provided on the camera body 11, the structure thereof can be simplified. Moreover, since the viewing optical system is coaxially aligned with the photographing optical system 12, the camera body 11 can be miniaturized when compared with a conventional arrangement in which the light path is bent or deflected by a mirror or the like.

Note that the electronic development type recording medium 30 is not limited to the above mentioned recording medium and can be of any type in which images are electronically developed.

The present invention can be applied not only to a single lens reflex camera but also to a lens shutter type camera.

The light source 42 can be made of any kind of a light source which emits a parallel light flux. The scanning optical system 43 can be realized, for example, by a single lens, a microlens array, a SELFOC lens array, or the like. A SELFOC lens is a lens manufactured by an ion exchange method whose index of refraction varies in accordance with location on a surface of a lens (i.e., a distributed diffraction type lens).

It is possible to arrange the line sensor 44 so as to detect light reflected by the electronic development type recording medium 30. Furthermore, an optical sensor which detects two dimensional images can be used.

As may be understood from the foregoing, according to the present invention, a simple finder system comprised of fewer optical elements can be obtained.

Having thus described the invention, what is claimed is:

1. A view finder for an electronic still camera, comprising:
a photographing optical system provided in front of a recording medium to form a picture image on said recording medium, said recording medium comprising a light transmission type medium on which a visible picture image is directly formed and on which the picture image can be viewed through the viewing optical system without application of any voltage to the recording medium; and
a viewing optical system provided optically behind said recording medium and on an optical axis of said photographing optical system, wherein the picture image formed on said recording medium can be viewed through said viewing optical system.

2. The view finder for an electronic still camera according to claim 1, wherein said recording medium is an electronic development type recording medium on which a visible image is formed upon photographing without any need for chemical treatment after exposure.

3. The view finder for an electronic still camera according to claim 2, further comprising:
a light source provided between said photographing optical system and said recording medium to illuminate said recording medium; and
a scanning optical system provided in an optical path of light transmitted through said recording medium which is illuminated by the light emitted from said light source.

4. The view finder for an electronic still camera according to claim 3, further comprising a moving mechanism which moves said light source and said scanning optical system with respect to said recording medium.

5. The view finder for an electronic still camera according to claim 4, wherein an optical element which constitutes at least a part of the viewing optical system is mounted to said moving mechanism to move together therewith.

6. The view finder for an electronic still camera according to claim 5, wherein an optical axis of said optical element is deviated from an optical axis of said scanning optical system.

7. The view finder for an electronic still camera according to claim 1, said recording medium serving as a focusing plate whereby an optical image of the picture image formed on the recording medium can be viewed through said viewing optical system.

8. The view finder according to claim 1, at least a portion of said viewing optical system being mounted for movement between a position at which the picture image can be viewed through the viewing optical system and a position at which the picture image cannot be viewed through the viewing optical system.

9. A view finder for an electronic still camera, comprising:
   a photographing optical system;
   a focusing plate on which an optical image formed by said photographing optical system is formed; and
   a viewing optical system through which the optical image formed on said focusing plate is viewed and through which the optical image can be viewed without application of any voltage to the recording medium;
   wherein said focusing plate comprises a light transmission type recording medium on which a visible picture image is directly formed.

10. The view finder for an electronic still camera according to claim 9, wherein said recording medium comprises an electronic development type recording medium on which a visible image is formed upon photographing without any need for chemical treatment after exposure.

11. A view finder for an electronic still camera, comprising:
   a photographing optical system provided in front of a recording medium to form a picture image on said recording medium, said recording medium comprising a light transmission type medium on which a visible picture image is directly formed;
   an optical scanner which reads the optical image formed on said recording medium; and
   a viewing optical system through which the picture image formed on said recording medium is viewed;
   wherein at least a part of said viewing optical system is mounted to said optical scanner.

12. The view finder for an electronic still camera according to claim 9, wherein said optical scanner comprises a light source provided between said photographing optical system and said recording medium to illuminate said recording medium, and a scanning optical system which is provided in an optical path of light transmitted through said recording medium which is illuminated by the light emitted from the light source, said at least a part of said viewing optical system being mounted on the scanning optical system.

13. The view finder for an electronic still camera according to claim 12, further comprising a moving mechanism which moves the light source and the scanning optical system with respect to said recording medium.

14. The view finder for an electronic still camera according to claim 13, wherein, when the moving mechanism moves the light source and the scanning optical system to a predetermined position, an image can be viewed through the viewing optical system.

15. The view finder for an electronic still camera according to claim 11, wherein said recording medium is an electronic development type recording medium on which a visible image is formed upon photographing without any need for chemical treatment after exposure.

16. The view finder for an electronic still camera according to claim 9, at least a portion of said viewing optical system being mounted for movement between a position at which the optical image formed on the focusing plate can be seen through the viewing optical system and a position at which the optical image formed on the focusing plate cannot be viewed through the viewing optical system.

17. The view finder for an electronic still camera according to claim 11, said recording medium serving as a focusing plate, whereby an optical image of the picture image formed on a recording medium can be viewed through said viewing optical system.

18. The view finder for an electronic still camera according to claim 11, wherein the picture image can be viewed through the viewing optical system without application of a voltage to the recording medium.

19. The view finder for an electronic still camera according to claim 11, wherein said at least a part of the viewing optical system is mounted for movement between a position at which the picture image formed on the recording medium can be viewed through the viewing optical system and a position at which the picture image cannot be viewed through the viewing optical system.

20. An electronic still camera comprising:
   a photographing optical system positioned on a first side of a recording medium to form a picture image on the recording medium:
   a viewing optical system positioned on a side of the recording medium opposite to said photographing optical system, said viewing optical system being provided so that the picture image formed by the photographing optical system can be viewed through the viewing optical system;
   a scanning optical system positioned on a side of the recording medium opposite to said photographing optical system, said scanning optical system provided to read the picture image formed on the recording medium by the photographing optical system;
   a mechanism for selectively moving at least a portion of said viewing optical system and said scanning optical system between a position in which said scanning optical system is operative to scan an image formed on the recording medium and a position in which at least a portion of said viewing optical system is positioned to enable the optical image formed on the recording medium to be viewed.

21. The electronic still camera according to claim 20, said recording medium comprising a light transmission recording medium on which a visible picture image is directly formed upon photographing without chemical treatment after exposure.

* * * * *